United States Patent
Emkey

(10) Patent No.: US 9,713,779 B2
(45) Date of Patent: Jul. 25, 2017

(54) CHEMICAL-FREE FOAM CONTROL SYSTEM AND METHOD

(71) Applicant: William Lewis Emkey, Stow, MA (US)

(72) Inventor: William Lewis Emkey, Stow, MA (US)

(73) Assignee: CHEMFREE DEFOAM LLC, Stow, MA (US)

( * ) Notice: Subject to any disclaimer, the term of this patent is extended or adjusted under 35 U.S.C. 154(b) by 14 days.

(21) Appl. No.: 14/754,322

(22) Filed: Jun. 29, 2015

(65) Prior Publication Data

US 2016/0001200 A1   Jan. 7, 2016

Related U.S. Application Data

(60) Provisional application No. 62/019,469, filed on Jul. 1, 2014.

(51) Int. Cl.
*B01D 19/02* (2006.01)
*B01D 17/02* (2006.01)
*A23N 12/02* (2006.01)

(52) U.S. Cl.
CPC ....... *B01D 17/0214* (2013.01); *A23N 12/023* (2013.01); *B01D 19/02* (2013.01); *C02F 2303/12* (2013.01)

(58) Field of Classification Search
CPC  B01D 17/0214; B01D 19/02; B01D 21/2433; C02F 2103/32; C02F 2303/12; A23N 12/023
USPC .......................... 210/776, 800, 523, 525, 540
See application file for complete search history.

(56) References Cited

U.S. PATENT DOCUMENTS

| 1,232,370 A | * | 7/1917 | Morison | B01D 35/027 210/525 |
| 3,056,749 A | * | 10/1962 | Griffith | B01D 19/02 210/221.1 |
| 3,219,189 A | * | 11/1965 | Moore | B03D 1/02 210/540 |

(Continued)

FOREIGN PATENT DOCUMENTS

FR   2381723   *  9/1978

*Primary Examiner* — Christopher Upton
(74) *Attorney, Agent, or Firm* — Louis J. Franco; Law Office of Louis J. Franco

(57) ABSTRACT

A method of subsiding foam resulting from an industrial process and moving it in a predetermined direction on the surface of an industrial-process liquid includes establishing a foam-displacement direction and a foam-displacement path. At least two fluid-spray sources from which a foam-subsiding fluid can be ejected are arranged serially above the industrial-process liquid and foam accumulating thereon. The fluid-spray sources are oriented and caused to eject foam-subsiding fluid such that foam impacted by foam-subsiding fluid ejected from the first fluid-spray source is wetted, partially subsided and displaced in the foam-displacement direction toward the spray being ejected from the second fluid-spray source by which the foam is further wetted, subsided and displaced in the foam displacement direction. In implementations including three or more fluid-spray sources, foam is moved sequentially through the sprays of the fluid-spray sources such that it is increasingly subsided as it moves through the foam-displacement path.

15 Claims, 4 Drawing Sheets

(56) References Cited

U.S. PATENT DOCUMENTS

| | | | | |
|---|---|---|---|---|
| 3,903,910 | A | * | 9/1975 | van Remmen ...... A23N 12/023 |
| | | | | 134/104.3 |
| 4,033,869 | A | * | 7/1977 | McGrew ............... E02B 15/108 |
| | | | | 210/767 |
| 4,058,481 | A | * | 11/1977 | Futai ...................... B01D 19/02 |
| | | | | 222/630 |
| 4,990,353 | A | * | 2/1991 | van der Schoot ... A23N 12/023 |
| | | | | 134/25.3 |
| 5,089,118 | A | * | 2/1992 | Mahoney ........... B01D 21/2433 |
| | | | | 210/525 |
| 5,122,280 | A | * | 6/1992 | Russell ............. B01D 17/0214 |
| | | | | 210/540 |
| 6,613,237 | B2 | * | 9/2003 | Pan ................... B01D 17/0214 |
| | | | | 210/523 |
| 2007/0068597 | A1 | * | 3/2007 | Dorsch ................ B01D 19/02 |
| | | | | 141/286 |
| 2010/0236999 | A1 | * | 9/2010 | Utsunomiya ...... B01D 21/2433 |
| | | | | 210/540 |

* cited by examiner

CHEMICAL-FREE FOAM CONTROL SYSTEM AND METHOD

PROVISIONAL PRIORITY CLAIM

Priority based on Provisional Application, Ser. No. 62/019,469 filed Jul. 1, 2014, and entitled "CHEMICAL-FREE FOAM CONTROL SYSTEM" is claimed. Moreover, the entirety of the previous provisional application, including the drawings, is incorporated herein by reference as if set forth fully in the present application.

BACKGROUND

Various industries, including the paper and pulp industries and food processing industries by way of non-limiting example, involve the generation of undesirable foam within and on the processing line. Left uncontrolled, this foam can accumulate uncontrollably and eventually shut down a processing line. A typical industry solution involves the addition of chemical de-foaming or anti-foaming agents to a liquid (e.g., water) associated with the industrial process in question. Although chemical additives have proven effective in controlling unwanted foam accumulation, effective non-chemical methods and solutions have been sought. Two reasons for avoiding chemical additives are cost and safety. Safety is a particular concern in industrial food processing settings because measure must be taken to ensure that levels of chemicals coming in contact with the food and reaming thereon after processing are acceptably low.

Typically the composition of built-up foam transitions from a 'wet foam' at the bottom of the foam (small bubble structure with water-like flow ability) to a 'dry foam' at the surface (large bubbles that adhere to all surfaces and resist flow). Once a significant foam build-up has accumulated, most of the foam volume consists of the drier foam. Several non-chemical approaches for foam control have been evaluated over the years. Some are currently utilized to a limited degree, but primarily to selectively augment chemical additives. There are primarily three basic non-chemical approaches for foam control: (1) water spray, (2) optical, and (3) centrifugal, each of which is briefly described in turn.

Water sprays are sometimes used to partially "knock down" the foam by spraying the top-surface dry foam to condense it from dry foam to wet foam and thereby reduce the total volume. Large foam-control spray systems are sometimes used in waste treatment and aquaculture farms. The use of water-spray foam control is confined primarily to localized trouble areas, where, due to a combination of physical layout and/or turbulent water flow, foam generation is rapid. These local sprays can be effective; however, in many cases, these sprays, while reducing the foam volume at the point of impact, can create holes in the foam while pushing foam into the periphery of the spray impact area where it continues to grow. Even the condensed 'wet foam' can continue to grow unacceptably within the spray impact area, thus minimizing any further reduction in foam volume. The use of a sprays in these localized 'hot spots' does not address the foam problem on the entire production line where, due to the continuous agitation throughout a facility, the foam builds within vessels and tanks, for example.

Optical solutions for controlling foam have been proposed and selectively tested. In one such system, a high power laser is used to destroy foam. These lasers emit light at or near a wavelength at which the liquid has a strong absorption line. It is believed that the optical absorption by the liquid locally heats the surface of a bubble and causes its destruction. One implementation of this approach includes a $CO_2$ laser mounted directly over a tank into which foam flows and where additional foam is also generated due to turbulence within the tank. The laser beam 'writes' a line across the foam in a continuously varying pattern. The line defines a region in which the foam is destroyed and the underlying surface water is exposed. Rapid writing of the laser beam reduces the foam volume in those regions and further inhibits foam growth because it provides a localized "non-foamed" region which the surrounding foam fills, thus reducing the rate of foam growth in surrounding regions of the tank. Cost is a primary factor restricting the commercial deployment of such systems. The combination of the systems' capital costs and theft operating costs, especially for deployment on a distributed processing line, is widely considered prohibitive.

Centrifugal systems have been used successfully for many years in a variety of industries and applications for separating the constituent liquids and gases of mixtures consisting of liquids and gases. Centrifugal gas/liquid separators typically rotate the liquid itself creating a cyclone or vortex within the liquid. As the "mixed medium" is rotated, the higher-density liquid is driven to the outside leaving behind on the inside the less dense gas, which can be subsequently removed.

Since foam is a gas/liquid mixture of, for example, air and water, a centrifugal gas/liquid separator can be a reasonable approach for non-chemical de-foaming. Consequently, variations of this technology have been studied and have resulted in designs, patents, and products directed at de-foaming applications. For the most part, air/gas separators are complicated systems, all of which require some subset of not only the means for high speed water rotation, but also vacuum systems, pumps, multi-stage impellers, filtering systems, and even heat. These systems do not lend themselves to in-situ foam control, but are best operated as an off-line system where the foamy solution needs to be pulled from all the key areas of the product-flow line into the separator(s), filtered, de-foamed, and then carefully pumped back into the line so as not to generate additional foam. Thus, the current separators manifest themselves as additional stand-alone closed operating systems. The costs associated with these systems are high and include capital cost, installation, maintenance, and floor space.

Other de-foaming technologies exist, but for very specialized applications, such as the aeration/separation systems used in aqua/fish farming. Similar to the application mismatches described above, these are large systems utilizing aeration, pumping and evacuation techniques. Ultrasonic solutions have also been proposed, and have found specialized applications, such as in canning operations, but have similarly proved not to be a good general fit for broad applications.

Accordingly, a need exists for a cost effective, chemical-free foam control system and method that lends itself to broad implementation across various industries challenged by undesirable foam generation.

SUMMARY

Various alternative implementations of a foam control system and method have in common the objective of subsiding, and moving in at least one predetermined direction, foam resulting from an industrial process and accumulating on the surface of a liquid associated with that industrial process. By way of non-limiting example, implementations are suited for use in industrial processes involving the washing of starchy or pulpy materials (e.g., paper, agricultural produce, etc.) which, when washed and/or churned in a reservoir of liquid associated with the process, yield foam that accumulates on the liquid. One example of a process for which implementations of the method and system is particularly well-suited involves the preparation of potatoes for the making of potato chips and, more particularly, the washing of potato slices in a wash table before the potato slices are conveyed out of the wash table for subsequent processing (e.g., cooking). While some implementations of the system and method are explained and described in the context of potato processing in both the summary and detailed description, it is to be understood that the invention as defined in the appended claims is not so limited, except to the extent that particular claims are expressly so limited by their own terminology. On the contrary, explicitly within the scope and contemplation of the overall inventive concept is its configuration for, and application within, nearly any process resulting in the production and accumulation of undesirable foam.

In each of various implementations, a foam-displacement path along which foam resulting from a relevant industrial process is to be moved is established. Also established is a direction along the foam-displacement path in which resultant foam is to be displaced as the foam accumulates on the surface of the liquid associated with the industrial process. In various industrial processes, the "liquid associated with the industrial process" as defined above, and in the claims appended hereto, will comprise water. In still more particular implementations, the liquid associated with the industrial process lacks chemical defoaming additives such as those presently employed and described in the background section of the specification.

A set of fluid-spray sources is provided including at least first and second fluid-spray sources from each of which a foam-subsiding fluid can be selectively ejected under pressure. In a typical implementation, the set of fluid-spray sources will include many more than two fluid-spray sources, but inventive concept is sufficiently broad to include implementations employing only first and second fluid-spray sources. Moreover, in practice, each fluid-spray source will comprise at least one spray nozzle.

The fluid-spray sources are serially arranged above the surface of the liquid associated with the industrial process. In the potato washing context, for example, this will mean the fluid-spray sources are arranged above the wash table, which includes a reservoir of water that serves as the "liquid associated with the industrial process." Each fluid-spray source is configured such that foam-subsiding fluid ejected therefrom is sprayed in a spray pattern that is centered about a spray axis. Additionally, each spray pattern, regardless of its general configuration (e.g., planar or conical) is representable by a spray vector extending along the spray axis. Each fluid-spray source is oriented such that its associated spray vector has (i) a non-zero component of spatial extension directed perpendicularly to, and downwardly toward, the liquid associated with the industrial process and (ii) a non-zero component of spatial extension directed parallel to the surface of the liquid associated with the industrial process and in the foam-displacement direction. More appreciable later in specification is that the serial arrangement of the fluid-spray sources defines the foam displacement path.

When the system is in use, foam-subsiding fluid is ejected from the fluid-spray sources such that foam impacted by foam-subsiding fluid ejected from the first fluid-spray source is wetted, partially subsided and displaced in the foam-displacement direction toward the spray being ejected from the second fluid-spray source by which the foam is further wetted, subsided and displaced in the foam displacement direction. Where the system implements three or more fluid-spray sources, foam initially displaced by the first fluid-spray source is displaced toward, under, then through the spray pattern associated with each successive fluid-spray source along the foam-displacement path, each time being further wetted, subsided and displaced. The result is that the foam volume is reduced as the foam is displaced long the foam-displacement path.

In a given implementation, the reduction in foam volume as the foam is impacted and displaced by foam-subsiding fluid can be a function of one or more alternative factors. For instance, the wetting of the foam serves to condense its constituent bubbles, but can also result in the destruction of bubbles, either of which contributes to a reduction in foam volume. Regardless, an important aspect and advantage of various implementations is that the foam reduction is induced entirely be mechanical means, and with the use of chemical defoaming additives in either the foam-subsiding fluid or the liquid associated with the industrial process.

While the physics behind at least some causes of the foam reduction associated with various implementations of the present invention is not completely understood, it has been repeatedly observed through experimentation by the present inventor that movement of the foam layer across the upper surface of the liquid associated with an industrial process results in foam-volume reduction from "the bottom up" within the foam layer. While an understanding of the operative physics behind this observed and readily repeatable behavior is not material to the issue of patentability, one possible explanation is that the foam bubbles in immediate contact with the surface of the liquid are adhering to the liquid through adhesive forces and then "popping" as they are deformed and sheered across the liquid surface by the impact of sprayed foam-subsiding fluid. Accordingly, various implementations prescribed moving foam with a non-zero net velocity relative to the underlying liquid associated with the industrial process. That is, this aspect of foam reduction is realized with the foam and underlying liquid are not moving together at the same rate. In fact, in order to maximize this observed foam-reducing benefit, various implementations call for the induced movement of the underlying liquid in a direction opposite to that in which the foam is being displaced at any given location along the foam-displacement path. It will be appreciated that such movement increases the relative velocity the foam layer with respect to the liquid situated thereunder.

Alternative implementations of a chemical-free foam control system employ "non-cyclic" and "cyclic" foam-displacement paths. In general terms, an aspect common to systems implementing non-cyclic or cyclic paths is that there is a path start corresponding to a first fluid-spray source and a path end corresponding to a last fluid-spray source. In a non-cyclic implementation, the path end is distinct from the path start, and it will generally be apparent which fluid-spray source is the first and which is the last along the foam-displacement path. In contrast, a cyclic implementation is one in which foam displaced to the path end corresponding to the last fluid-spray source is further displaced by the last fluid-spray source toward the path start corresponding to the first fluid-spray source. In other words, in keeping with what even a casual observer might expect, a cyclic path is one that forms a "closed loop" or "endless loop or path." Moreover, in a system employing a cyclic foam-displacement path, which fluid-spray source is to be regarded as the first in the path may be purely arbitrary, while the last fluid-spray source would typically be regarded as the fluid-spray source immediately "behind" the spray source designated as "first" relative to the displacement direction of the foam.

Representative embodiments are more completely described and depicted in the following detailed description and the accompanying drawings.

DETAILED DESCRIPTION

Figure 1:
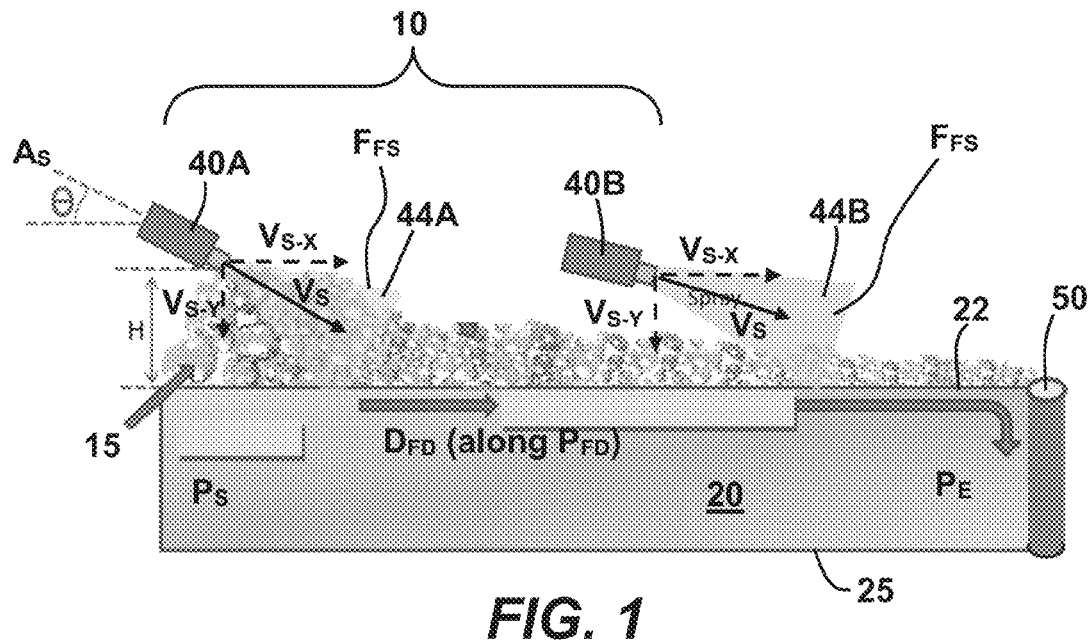
FIG. 1 is a schematic side view of tank or reservoir containing a liquid associated with an industrial process on the surface of which has accumulated a layer of foam that is being sprayed and displaced from left to right by first and second fluid-spray sources.

The following description of variously configured and implemented foam control systems and methods is demonstrative in nature and is not intended to limit the invention or its application of uses. Accordingly, the various implementations, aspects, versions and embodiments described in the summary and detailed description are in the nature of non-limiting examples falling within the scope of the appended claims and do not serve to define the maximum scope of the claims.

Shown in FIGS. 1-6 are various aspects of a foam control system 10 for subsiding and displacing foam 15 resulting from an industrial process and accumulating on an upper surface 22 of a liquid 20 associated with that industrial process. For ease of reference and brevity, the liquid 20 associated with the industrial process is alternatively referred to, interchangeably, as "industrial-process liquid 22," with the same reference character 20 being used in association with either textual descriptor for the liquid 20.

Figure 3:
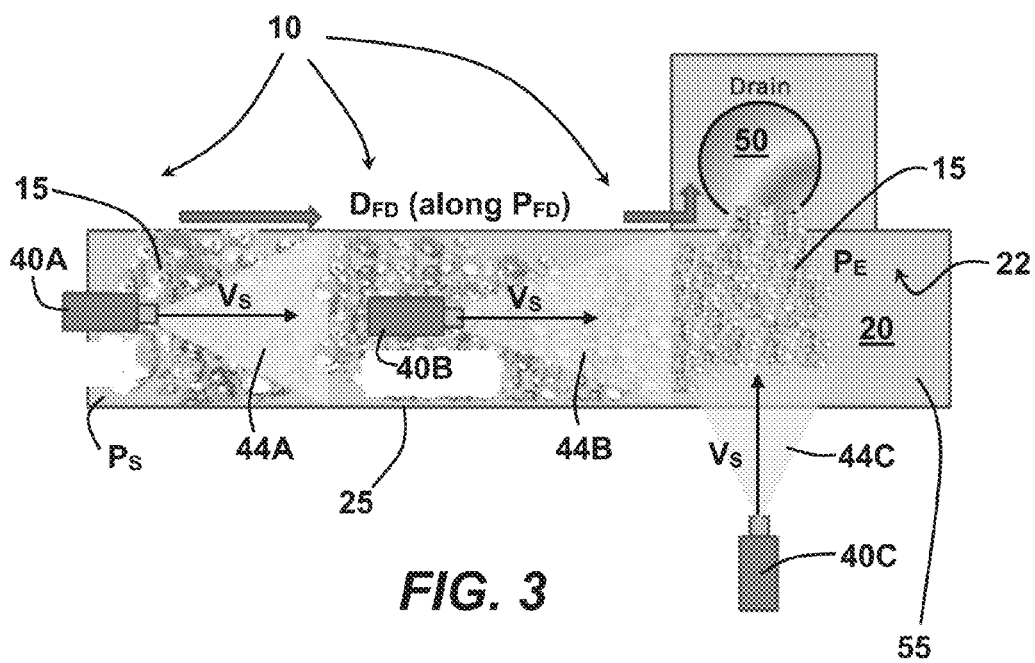
FIG. 3 is a top-down schematic view of a reservoir of liquid having a build-up of foam thereon and of a foam control system including three fluid-spray sources for subsiding and displacing the foam along a non-cyclic foam-displacement path and into a drain that is in fluid communication with the reservoir.
Figure 4:
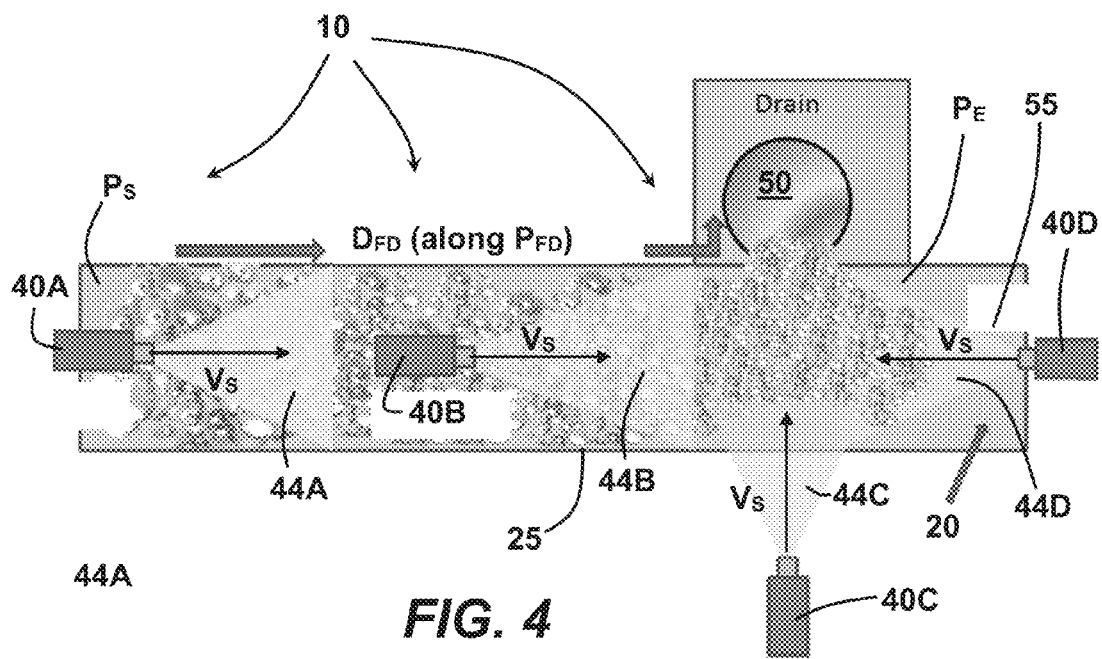
FIG. 4 is a top-down schematic view of a reservoir of liquid having a build-up of foam thereon and of a foam control system including four fluid-spray sources for subsiding and displacing the foam along a non-cyclic foam-displacement path and into a drain that is in fluid communication with the reservoir.
Figure 5:
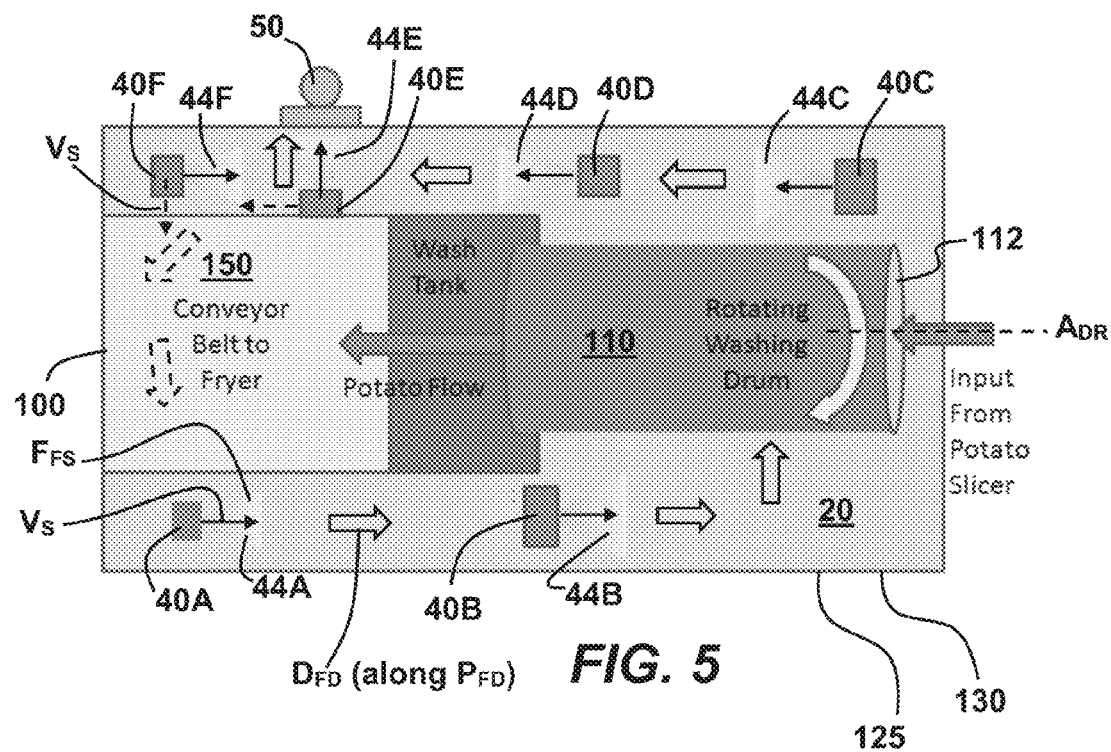
FIG. 5 is a top-down schematic view of a foam control system implemented in association with a potato processing facility that includes a potato washing drum partially immersed in a reservoir of water defined by an industrial wash table.

In order to provide an illustrative context and environment in association with which variations of the system 10 may be employed, alternative implementations are described with principal reference to FIGS. 1, 3, 4, and 5 in each of which there is depicted a tank or reservoir 25 for containing the industrial-process liquid 20 $A_S$ indicated in the summary, the relevant industrial-process liquid 20 may comprise water. In FIG. 1, a schematic side view of an illustrative processing environment is depicted, while FIGS. 3, 4 and 5 provide top-down schematic views of alternatively configured processing environments.

As illustrated in each of FIGS. 1 and 3-5, implementations of the foam control system 10 and associated method require establishment of a foam-displacement path $P_{FD}$ along which foam 15 resulting from a relevant industrial process is to be displaced. Also established is a foam-displacement direction $D_{FD}$ along the foam-displacement path $P_{FD}$ in which resultant foam 15 is to be displaced as the foam 15 accumulates on the surface 22 of the industrial-process liquid 20. Both the foam-displacement path $P_{FD}$ and the path direction $D_P$ are indicated by arrows within the relevant drawings.

Referring still to FIGS. 1 and 3-5, a set of fluid-spray sources 40 is provided that includes at least first and second fluid-spray sources 40A and 40B, but can include additional fluid-spray sources 40C, 40D, 40E, etc. In each of the drawings, the fluid-spray sources are denoted by reference characters including the same numeric element "40," but are distinguished from each other in that each is denoted, within each drawing, by a distinct alphabetic element (e.g., "A," "B," "C," etc.). Moreover, when the fluid-spray sources 40 are referred to collectively, or there is otherwise no need to refer to is any of them in particular, only the "base" numeric element is used. Moreover, elements of other aspects of the system 10, such as spray patterns 44, are numbered using a similar alphanumeric convention as indicated.

Figure 2:
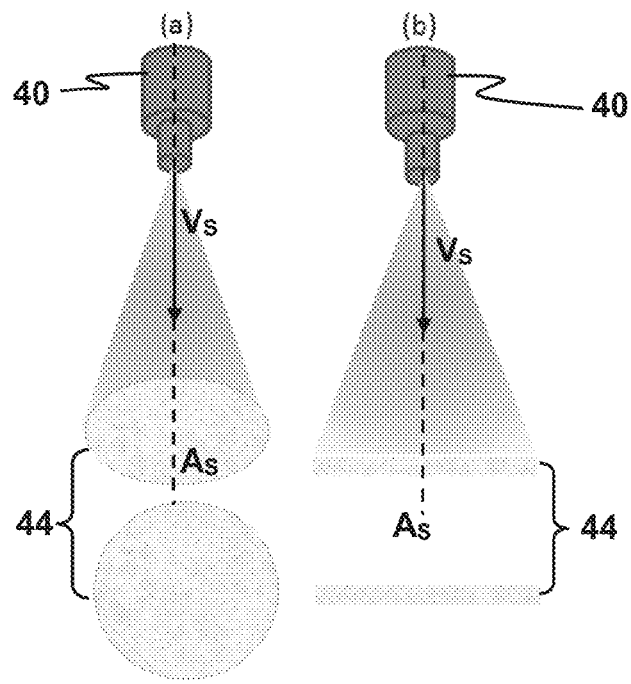
FIG. 2 shows two illustrative fluid-spray sources and their associated spray patterns: (a) representing a conical spray pattern and (b) representing a "flat," relatively planar spray pattern.

The fluid-spray sources 40 are serially arranged above the surface 22 of the industrial-process liquid 20. Each fluid-spray source 40 as the capacity to selectively eject under pressure a foam-subsiding fluid $F_{FS}$. Moreover, each fluid-spray source 40 is configured such that foam-subsiding fluid $F_{FS}$ ejected therefrom is sprayed in a spray pattern 44 that is centered about a spray axis $A_S$. Illustrative spray patterns 44 are shown in FIG. 2 and discussed below.

Regardless of its general configuration (e.g., planar or conical), each spray pattern 44 is representable by a spray vector $V_S$ extending along the spray axis $A_S$ about which that spray pattern 44 is centered. As depicted most clearly in the example represented by the schematic side view of FIG, 1, each fluid-spray source 40 is oriented such that its associated spray vector $V_S$ has (i) a non-zero component of spatial extension directed perpendicularly to, and downwardly toward, the industrial-process liquid and (ii) a non-zero component of spatial extension directed parallel to the surface 22 of the industrial-process liquid 20 and in the foam-displacement direction $D_{FD}$. In plainer terms, this simply indicates that each fluid-spray source 40 is angularly oriented such that its associated spray vector $V_S$ is neither entirely perpendicular nor entirely parallel to the surface 22 of the industrial-process liquid 20.

For ease of identification and further discussion, the horizontal component of a spray vector $V_S$ (i.e., the spatial-extent component of non-zero magnitude that is parallel to the surface 22 of the industrial-process liquid 20) is denoted by a dashed arrow labeled with the alphanumeric reference character $V_{S-X}$. In keeping with this Cartesian notation convention, the vertical component of a spray vector $V_S$ (i.e., the spatial-extent component of non-zero magnitude that is perpendicular or "orthogonal" to the surface 22 of the industrial-process liquid 20) is denoted by a dashed arrow labeled with the alphanumeric reference character $V_{S-Y}$. Of course, it will be readily appreciated that the ratio $V_{S-Y}/V_{S-X}$ is directly related (by the trigonometric function "tangent") to the spray-source orientation angle θ at which the spray vector $V_S$ is pitched relative to horizontal. Nevertheless, the ratio $V_{S-Y}/V_{S-X}$ itself is an important factor to conceptualize in relation to the functionality of various implementations and may vary among locations along the foam-displacement path $P_{FD}$. Presently, relative to various implementations, it is sufficient to observe in very general terms that, of the two spatial-extent components, the vertical component $V_{S-Y}$ is principally responsible for subsiding foam 15, while the horizontal component $V_{S-X}$ is principally responsible for moving the foam 15 along the surface 22 of the industrial-process liquid 20 in the foam-displacement direction $D_{FD}$. Accordingly, implementations of the foam control system 10 are most efficient when the ratio $V_{S-Y}/V_{S-X}$ is optimized at each fluid-spray source 40 for both the foam-subsiding and foam-displacement factors simultaneously.

With broader reference once again to FIGS. 1 and 3-5, when an implementation of the foam control system 10 is in use, foam-subsiding fluid $F_{FS}$ is ejected from the fluid-spray sources 40 such that foam 15 impacted by foam-subsiding fluid $F_{FS}$ ejected from the first fluid-spray source 40A is wetted, partially subsided and displaced in the foam-displacement direction $D_{FD}$ toward the spray being ejected from the second fluid-spray source 40B by which the foam 15 is further wetted, subsided and displaced in the foam-displacement direction $D_{FD}$. When three or more fluid-spray sources 40 are deployed, foam 15 initially displaced by the first fluid-spray source 40A is displaced toward, under, then through the spray pattern 44 associated with each successive fluid-spray source 40 along the foam-displacement path $P_{FD}$, thereby being further wetted, subsided and displaced in the foam-displacement direction $D_{FD}$ along the foam-displacement path $P_{FD}$. From the aforesaid, it will be readily appreciated that the serial arrangement of the fluid-spray sources 40 defines the foam displacement path $P_{FD}$ and that the volume of the foam 15 is reduced as the foam 15 is displaced along the foam-displacement path $P_{FD}$. Implementations of the foam control system 10 treat foam control in a holistic manner, rather than regarding foam control as a localized issue to be treated by selective "knock down" or chemical treatment as problematic accumulation arises. In implementations of the present system and method, foam 15 is subsided and displaced in a continuous manner along the predefined foam-displacement path $P_{FD}$.

As discussed in the summary, as well as above in the detailed description relative specifically to the spray-source orientation angle θ and the ratio $V_{S-Y}/V_{S-X}$, the reduction in the volume of foam 15 as the foam 15 is impacted and displaced by foam-subsiding fluid $F_{FS}$ is a function of one or more alternative factors, In addition to those factors already discussed, foaming conditions of the specific industrial processing setting within which the foam control system 10 and method is implemented determines parameters for each fluid-spray source 40. In addition to the spray-source orientation angle θ, other important parameters include (i) the height H of each fluid-spray source 40 above the upper surface 22 of the industrial-process fluid 20, (iii) the configuration of the spray pattern 44, (iv) the spray droplet size, and (v) the force with which the spray impacts the foam 15 and the surface 22 of the industrial-process liquid 20. Such parameters are selected with the objective of optimizing foam-condensation efficiency and movement (flow rate) of the condensed foam 15, while minimizing the creation of additional foam 15 due to the spray impact on the surface 22 of the industrial-process liquid 20.

In various settings, minimizing the spray-source orientation angle θ works favorably for all desired effects. Lower spray-source orientation angles θ tend to increase the effective cross-sectional area of the spray pattern 44, especially for "full" spray patterns (e.g., a filled or full conical spray pattern), thus increasing the area of foam 15 that is impacted for condensation. Moreover, as the spray-source orientation angle θ is decreased, the "forward thrust" component of the spray force (i.e., along the $V_{S-X}$ component of the spray vector $V_S$) increases, thus facilitating the movement of the condensed foam 15 along the foam-displacement path $P_{FD}$.

In one illustrative implementation, at least the first fluid-spray source 40A ejects a "full spray" spray pattern 44A. A non-limiting illustrative example of a "full spray" spray pattern 44 is shown in the left side portion of FIG. 2 designated as "(a)." In this particular example, the spray pattern 44 has a generally conical configuration. The spray pattern 44 is regarded as "full" because (i) its interior is occupied by jets or sprays of foam-subsiding fluid $F_{FS}$ and/or (ii) because it not a "flat spray," an example of which is shown in the right side portion of FIG. 2 designated as "(b)." In contrast, a "hollow" spray pattern 44 of conical configuration would include jets of foam-subsiding fluid $F_{FS}$ only at the outside; those necessary to define the cone, while the interior would include no jets of foam-subsiding fluid $F_{FS}$, at least not by design. A full spray pattern 44 is a preferable choice for the first fluid-spray source 40A in various implementations because such sprays have a high cross-sectional area (dense with water jets) and, therefore, effectively cover and condense higher-volume "dry" foam 15 that manifests nearer the beginning of the foam-displacement path $P_{FD}$.

Referring to the right side portion of FIG. 2 designated as "(b)," a so-called "flat" spray pattern 44 is shown. Flat spray patterns 44 are more suited for implementation from fluid-spray sources 40 subsequent to the first fluid-spray source 40A. This is because foam 15 arriving toward spray patterns 44 subsequent to that issuing from the first fluid-spray source 40A has already been partially condensed and, therefore, has a reduced volume. Ratter spray patterns 44 can effectively cover the reduced-volume foam 15 and effectively displace it in the foam-displacement direction $D_{FD}$ since their associated spray vectors $V_S$ can have horizontal components $V_{S-X}$ much greater in magnitude than their vertical components $V_{S-Y}$. Of course, these are provided only as edifying, illustrative examples, and local foaming conditions and structural geometries may be better suited to alternative spray types, locations and spray-source orientation is angles θ.

As described in the summary, alternative implementations of a chemical-free foam control system 10 employ "non-cyclic" and "cyclic" foam-displacement paths $P_{FD}$. Included in FIGS. 1, 3 and 4 are schematic depictions of non-cyclic foam-displacement paths $P_{FD}$, while FIG. 5 shows a system 10 that can be switch between cyclic and non-cyclic foam-displacement paths $P_{FD}$, and FIG. 6 is a top-down schematic view of a reservoir 25, fluid-spray sources 40 and spray patterns 44 defining a cyclic foam-displacement path $P_{FD}$.

An aspect common to systems 10 implementing non-cyclic or cyclic foam-displacement paths $P_{FD}$ is that there is a path start $P_S$ corresponding to a first fluid-spray source 40A and a path end $P_E$ corresponding to a last fluid-spray source 40. In a non-cyclic implementation, such as those of FIGS. 1, 3 and 4, the path end $P_E$ is distinct from the path start $P_S$, and it will generally be apparent which fluid-spray source 40 is the first and which is the last along the foam-displacement path $P_{FD}$. In contrast, a cyclic implementation, such as that depicted in FIG. 6, is one in which foam 15 displaced to the path end $P_E$ corresponding to the last fluid-spray source 40 is further displaced by the last fluid-spray source 40 toward the path start Ps corresponding to the first fluid-spray source 40. Because, in a cyclic system 10, the foam-displacement path $P_{FD}$ is essentially a "closed loop," which fluid-spray source 40 is regarded as the first fluid-spray source 40A may be arbitrary. However, once the first fluid-spray source 40A is designated, the last fluid-spray source 40 would typically be regarded as the fluid-spray source 40 immediately "behind" the fluid-spray source 40 designated as "first" relative to the foam-displacement direction $D_{FD}$.

Referring again specifically to FIG. 1, a simple foam control system 10 employing only first and second fluid-spray sources 40A and 40B defining a lineal foam-displacement path $P_{FD}$ is depicted in a side-view schematic. In this example, it can be seen that the first fluid-spray source 40A corresponding to the path start $P_S$ is pitched at a fluid-spray orientation angle θ and has an associated vertical component $V_{S-Y}$ sufficiently large for its spray-pattern 44A to wet and subside the build-up of drier and more-highly-stacked foam 15 nearest the path start $P_S$, while still having a horizontal component $V_{S-X}$ sufficiently large to displace the partially-subsided foam toward the spray pattern 44B issuing from the second fluid-spray source 40B. The spray pattern 44B associated with the second fluid-spray source 40B further subsides the foam 15 and displaces it toward a drain 50 adjacent the path end $P_E$, and in-line with the foam-displacement path $P_{FD}$. Because the foam 15 being impacted by the spray pattern 44B associated with the second fluid-spray source 40B arrives partially subsided, the spray vector $V_S$ associated with the second fluid-spray source 40B has a larger horizontal component $V_{S-X}$ and smaller vertical component $V_{S-Y}$ than the spray vector $V_S$ associated with the first fluid-spray source 40A, consistent with the discussion in preceding paragraphs addressing spray patterns 44 and spray-source orientation angles θ.

FIGS. 3 and 4 are top-down schematic views of two similar foam control systems 10 in nearly-identical industrial process settings which, like the setting in FIG. 1, include reservoirs 25 for containing industrial-process liquid 20. In each of the cases of FIGS. 3 and 4, the foam-displacement path $P_{FD}$ defined by the fluid-spray sources 40 is both non-cyclic and non-lineal. Moreover, each includes a drain 50 for receiving industrial-process liquid 20 and any remaining, non-subsided foam 15. However, in contrast to the setting of FIG. 1, the drain 50 in each of FIGS. 3 and 4 is not "in-line" with the predominant foam-displacement path $P_{FD}$. More specifically, after extending in a first lineal direction—left-to-right in each of FIGS. 3 and 4—for some distance, the foam-displacement path $P_{FD}$ is diverted to the left by a third fluid-spray source 40C that is aimed orthogonally to the previous portion of the foam-displacement path $P_{FD}$ defined by first and second fluid-spray sources 40A and 40B. This diversion in the direction of the foam displacement path $P_{FD}$ facilitates delivery of subsided foam 15 to the drain 50 is situated to the left side of the reservoir 25.

Referring still to FIGS. 3 and 4, each reservoir 25 includes a "dead zone" 55 where foam 15 would, under normal conditions, collect and overflow the reservoir 25 in that region. This is a scenario worth addressing because such dead zones 55 are common in existing industrial process settings. To counter the build-up of foam 15 in the dead zone 55, the implementation of FIG. 4 differs from that of FIG. 4 in that the implementation of FIG. 4 further includes a fluid-spray source 40D directed outwardly from the dead zone 55 and toward the fluid-spray source 40C that directs foam 15 into the drain 50.

FIG. 5 is a top-down schematic view of a foam control system 10 implemented in association with a potato processing facility 100. While extensive detail relative to the potato processing facility 100 is not critical, some detail is warranted for purposes of providing context. The potato processing facility 100 includes a screened, rotatable potato wash drum 110 partially immersed in a reservoir 125 of industrial-process liquid 20. In this setting, the reservoir 125 is a wash tank that is part of an industrial wash table 130 and the industrial-process liquid 20 comprises water. Potato slices (not shown) are fed into the potato wash drum 110, which is partially immersed in the industrial-process liquid 20 below the drum-rotation axis $A_{DR}$. As the wash drum 110 rotates, the potato slices are tossed about, churned and washed by the industrial-process liquid 20 (water) in the reservoir 125. Washed potato slices then exit the wash drum 110 from which they are carried up by an inclined conveyor 150 for subsequent processing.

As with the examples of the previous schematics, the foam control system 10 employs a plurality of fluid-spray sources 40 which, in the present example, are numbered 44A thru 44F using consecutive letters of the alphabet. The system 10 depicted in FIG. 5 can be operated alternatively in a cyclic or non-cyclic fashion, depending on the selective operation and orientation of fluid-spray sources 40E and 40F.

In either a cyclic or non-noncyclic operative mode, foam 15 (omitted in this drawing for clarity) is moved along the foam-displacement path $P_{FD}$ from the path start $P_S$ near fluid-spray source 40A toward fluid-spray source 40D. In either case, the foam 15 is moved in a non-lineal way and, in this particular setting, its movement is enhanced by the rotation of the partially-immersed wash drum 110 which, when viewed from the wash-drum input end 112, rotates counter-clockwise, thereby conveying foam 15 sprayed by fluid-spray source 40B on one side of the drum-rotation axis $A_{DR}$ toward fluid-spray source 40C located on the opposite side of the drum-rotation axis $A_{DR}$.

In order to operate the system 10 of FIG. 5 in a non-cyclic mode, fluid-spray source 40E is oriented so as to direct toward drain 50 foam arriving from the region of fluid-spray source 40D. In this mode, fluid-spray source 40F can either be turned off or it can be directed to spray foam-subsiding fluid $F_{FS}$ back toward fluid-spray source 40E in much the same manner that fluid-spray source 40D is directed back toward fluid-spray source 40C in FIG. 4. Alternatively, in an illustrative cyclic operative mode, fluid-spray source 40F can be directed to spray foam-subsiding fluid $F_{FS}$ toward fluid-spray source 40A in order to move any remaining non-subsided foam 15 under the conveyor 150 toward fluid-spray source 40A. Moreover, fluid-spray source 40E can either be turned off or directed to spray foam-subsiding fluid $F_{FS}$ toward fluid-spray source 40F. In FIG. 5, the illustrative non-cyclic foam-displacement path $P_{FD}$ is indicated by solid-line arrows, while the alternative cyclic foam-displacement path $P_{FD}$ is indicated by a combination of solid-line arrows where the paths are the same and dashed-outline arrows where the cyclic path deviates from the non-cyclic foam-displacement path $P_{FD}$. Additionally, the spray vectors Vs associated with fluid-spray sources 40E and 40F for he cyclic scenario are indicated in dashed lines.

Figure 6:
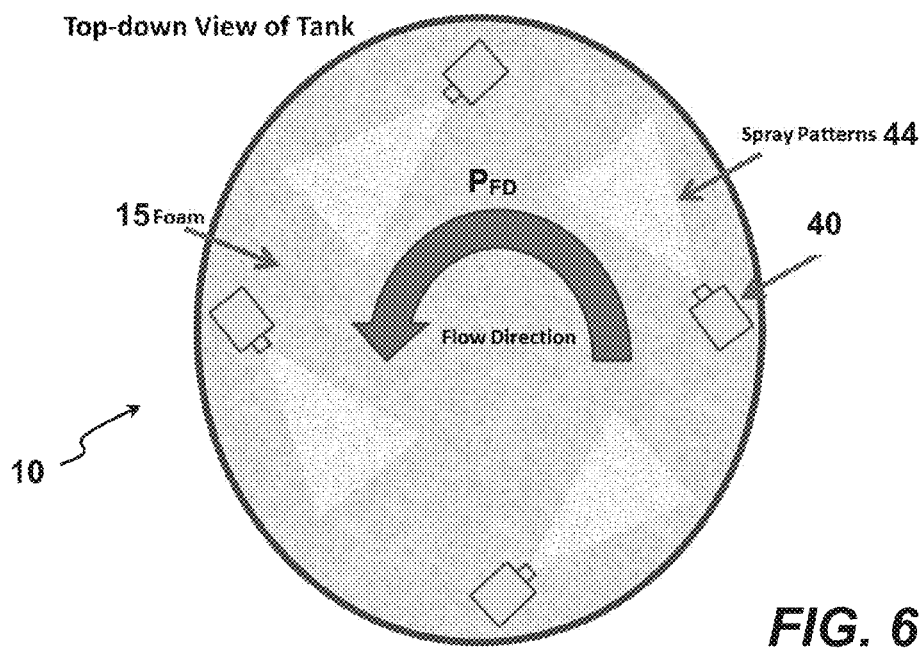
FIG. 6 is a top-down schematic view of a foam control method employing a cyclic foam-displacement path.

FIG. 6 is a top-down schematic showing a foam control system 10 and associated method employing a cyclic foam-displacement path $P_{FD}$. FIG. 6 is schematically represents one mode in which the foam control system 10 of FIG. 5 can operate, but such a cyclic system can also be employed outside of the processing line. For instance, foam 15 exiting a processing area through drains 50 such as those shown in FIGS. 1 and 3-5 could be channeled to a tank (not shown) in which a cyclic foam-displacement path $P_{FD}$ is configured to further subside foam 15 after its removal from the in-line industrial-processing area, and before it is permitted to drain out into a central drainage system, such as public works. Elements of the system 10, even those no specifically discussed in this paragraph (e.g. fluid-spray sources 40), are numbered in a manner consistent with the previous numbering convention used throughout the detailed description.

Figure 7:
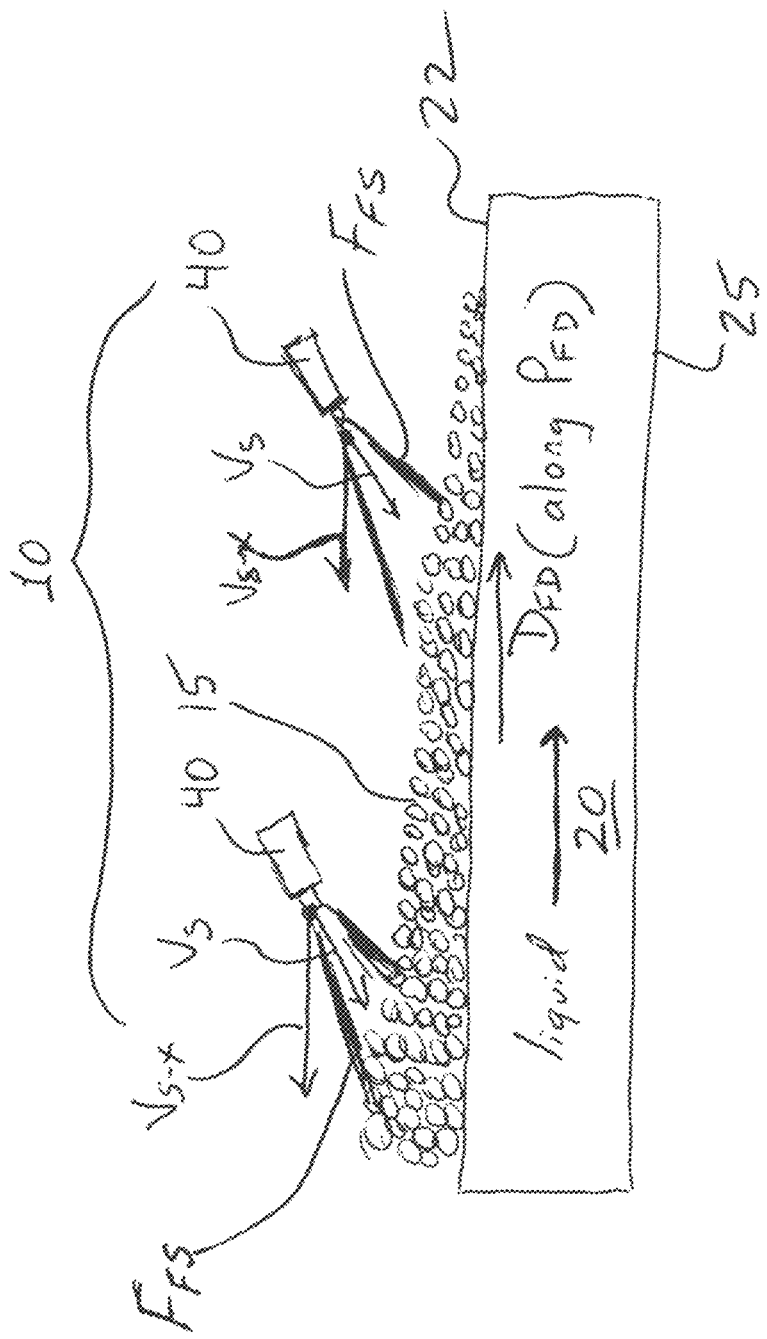
FIG. 7 is a side-view schematic depicting a foam control system including fluid-spray sources directed in opposition to a foam-displacement direction.

While illustrative implementations discussed above focused principally on scenarios in which the horizontal component $V_{S-X}$ of each spray vector $V_S$ is directed in the foam-displacement direction $F_{FD}$, there are within the scope and contemplation of the invention alternative versions in which the $V_{S-X}$ component of each spray vector $V_S$ is directed in opposition to the foam-displacement direction $D_{FD}$. For instance, shown in FIG. 7 is a case in which the industrial-process liquid 20 is itself being moved by a force other than that incidentally imparted by the foam-subsiding fluid $F_{FS}$, the moving industrial-process liquid 20 may carry the foam 15 along the foam-displacement path $P_{FD}$ and in the foam-displacement direction $D_{FD}$. Such other forces might include gravity or impellors or fluid-moving jets under the surface 22 of the industrial-process liquid 20. In such cases, the serially arranged fluid-spray sources 40 still subside the foam 15 in a sequential manner, but the horizontal components $V_{S-X}$ of their spray vectors $V_S$ are not iS responsible for moving the foam 15 along the oppositely-directed foam-displacement direction $D_{FD}$. Instead, each successive fluid-spray source 40 along the foam-displacement path $P_{FD}$ partially subsides the foam 15 which foam 15 is carried by the flowing industrial-process liquid 20 toward the next successive fluid-spray source 40 that is spraying in a direction opposed to the flow of the industrial-process liquid 20. While systems that eject foam-subsiding fluid $F_{FS}$ in opposition to the flow of the industrial-process liquid 20 are envisioned as a special case, a setting in which such a system might be used is one in which the industrial-process liquid 20 is being drawn by gravity down an inclined flume (not shown) and the movement of the industrial-process liquid 20 is sufficiently energetic to carry with it the successively-subsiding foam 15 in opposition to the sprays of foam-subsiding fluid $F_{FS}$ issuing from the fluid-spray sources 40.

The foregoing is considered to be illustrative of the principles of the invention, Furthermore, since modifications and changes to various aspects and implementations will occur to those skilled in the art without departing from the scope and spirit of the invention, it is to be understood that the foregoing does not limit the invention as expressed in the appended claims to the exact constructions, implementations and versions shown and described.

What is claimed is:

1. A method of subsiding, and moving in at least one predetermined direction, foam resulting from an industrial process and accumulating on the surface of a liquid associated with that industrial process, the method comprising:
    establishing a foam-displacement direction and a foam-displacement path along which foam resulting from the industrial process is to be displaced as the foam accumulates on the surface of the liquid associated with the industrial process;
    providing a set of fluid-spray sources including at least first and second fluid-spray sources from which a foam-subsiding fluid can be selectively ejected under pressure;
    arranging the fluid-spray sources serially above the surface of the liquid associated with the industrial process, and orienting each fluid-spray source, such that foam-subsiding fluid ejected from each fluid-spray source is sprayed in a spray pattern that is centered about a spray axis and representable by a spray vector extending along the spray axis and having (i) a non-zero component of spatial extension directed perpendicularly to, and downwardly toward, the liquid associated with the industrial process and (ii) a non-zero component of spatial extension directed parallel to the surface of the liquid associated with the industrial process and in the foam-displacement direction, wherein the serial arrangement of the fluid-spray sources defines the foam displacement path; and
    ejecting foam-subsiding fluid from the fluid-spray sources such that foam impacted by foam-subsiding fluid ejected from the first fluid-spray source is wetted, partially subsided and displaced in the foam-displacement direction toward the spray being ejected from the second fluid-spray source by which the foam is further wetted, subsided and displaced in the foam displacement direction.

2. The method of claim 1 wherein the foam-subsiding fluid is a foam-subsiding liquid.

3. The method of claim 2 wherein (i) the foam-subsiding liquid is water lacking chemical defoaming additives and (ii) the liquid associated with the industrial process also lacks chemical defoaming additives.

4. The method of claim 1 wherein
    (i) the foam-displacement path is non-cyclic such that there is a path start corresponding to the first fluid-spray source and a path end corresponding to a last fluid-spray source; and
    (ii) the path end is distinct from the path start.

5. The method of claim 1 wherein
    (i) the foam-displacement path is cyclic such that there is a path start corresponding to the first fluid-spray source and a path end corresponding to a last fluid-spray source; and
    (ii) foam displaced to the path end corresponding to the last fluid-spray source is further displaced by the last fluid-spray source toward the path start corresponding to the first fluid-spray source.

6. The method of claim 1 wherein the fluid-spray sources are configured to eject foam-subsiding fluid such that foam impacted by the foam-subsiding fluid is displaced over the liquid associated with the industrial process with a non-zero net velocity relative to said liquid.

7. The method of claim 1 wherein the set of fluid-spray sources includes at leas three fluid-spray sources.

8. The method of claim 7 implemented in conjunction with an industrial wash table defining a reservoir for containing the liquid associated with the industrial process.

9. The method of claim 8 wherein the liquid associated with the industrial process comprises water and the industrial wash table is configured for washing agricultural produce.

10. The method of claim 9 wherein the agricultural produce comprises potatoes.

11. A method of subsiding, and moving in at least one predetermined direction, foam resulting from an industrial process and accumulating on the surface of a liquid associated with that industrial process, the method comprising:
    establishing a foam-displacement direction and a foam-displacement path along which foam resulting from the industrial process is carried on the surface of liquid associated with the industrial process, which liquid is moving in the foam-displacement direction along the foam-displacement path;

providing a set of fluid-spray sources including at least first and second fluid-spray sources from which a foam-subsiding fluid can be selectively ejected under pressure;

arranging the fluid-spray sources serially above the surface of the moving liquid associated with the industrial process, and orienting each fluid-spray source, such that foam-subsiding fluid ejected from each fluid-spray source is sprayed in a spray pattern that is centered about a spray axis and representable by a spray vector extending along the spray axis and having (i) a non-zero component of spatial extension directed perpendicularly to, and downwardly toward, the liquid associated with the industrial process and (ii) a non-zero component of spatial extension directed parallel to the surface of the liquid associated with the industrial process and in opposition to the foam-displacement direction, wherein the serial arrangement of the fluid-spray sources defines the foam displacement path; and ejecting foam-subsiding fluid from the fluid-spray sources such that foam impacted by foam-subsiding fluid ejected from the first fluid-spray source is wetted and partially subsided as it is being displaced in the foam-displacement direction by the moving liquid associated with the industrial process toward the spray being ejected from the second fluid-spray source by which the foam is further wetted and subsided.

12. The method of claim 11 wherein the foam-subsiding fluid is a foam-subsiding liquid.

13. The method of claim 12 wherein (i) the foam-subsiding liquid is water lacking chemical defoaming additives and (ii) the liquid associated with the industrial process also lacks chemical defoaming additives.

14. The method of claim 11 wherein
(i) the foam-displacement path is non-cyclic such that there is a path start corresponding to the first fluid-spray source and a path end corresponding to a last fluid-spray source; and
(ii) the path end is distinct from the path start.

15. The method of claim 11 wherein the foam-displacement path is cyclic such that there is a path start corresponding to the first fluid-spray source and a path end corresponding to a last fluid-spray source.

* * * * *